(No Model.) 2 Sheets—Sheet 1.

H. AMMENHEUSER.
MACHINE FOR MOLDING FLOWER POTS.

No. 334,406. Patented Jan. 19, 1886.

(No Model.)  2 Sheets—Sheet 2.
H. AMMENHEUSER.
MACHINE FOR MOLDING FLOWER POTS.
No. 334,406. Patented Jan. 19, 1886.
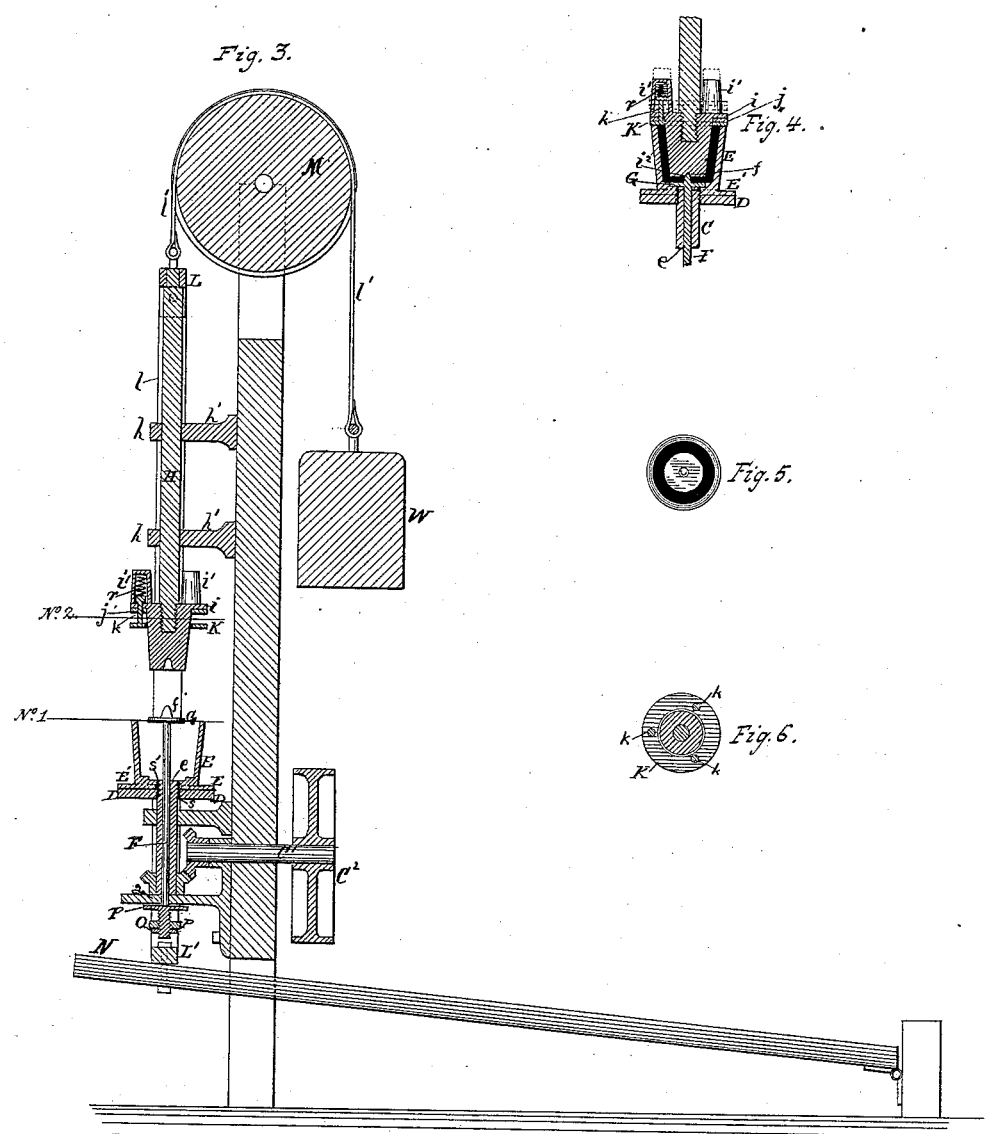

UNITED STATES PATENT OFFICE.

HERMANN AMMENHEUSER, OF ALBANY, NEW YORK.

MACHINE FOR MOLDING FLOWER-POTS.

SPECIFICATION forming part of Letters Patent No. 334,406, dated January 19, 1886.

Application filed June 23, 1885. Serial No. 169,549. (No model.)

*To all whom it may concern:*

Be it known that I, HERMANN AMMENHEUSER, a citizen of the United States, residing in the city of Albany, county of Albany, and State of New York, have invented certain new and useful Improvements in Machines for Molding Flower-Pots, of which the following is a specification.

My invention relates to machines for molding flower-pots, in which is employed the several devices and combinations of devices hereinafter described and particularly set forth.

The objects of my invention are to provide means for molding flower-pots in a rapid manner, and to provide a simple and durable machine by which the clay will be properly packed and molded, and the molded pots will be automatically delivered from the mold. I attain these objects by the means illustrated in the accompanying drawings, in which—

Figure 1:
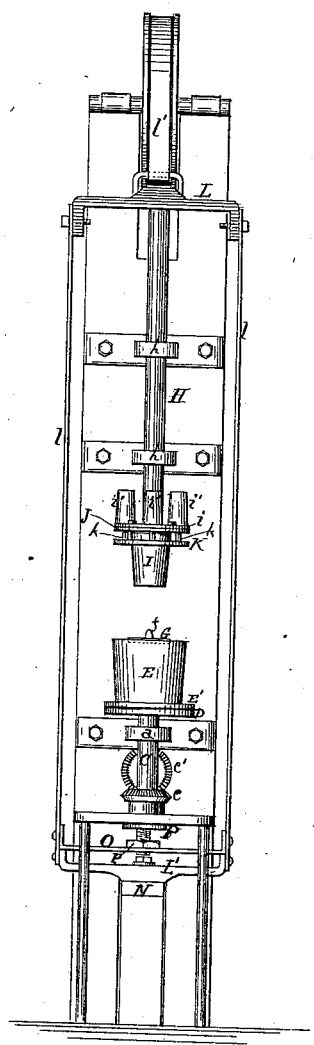
Figure 2:
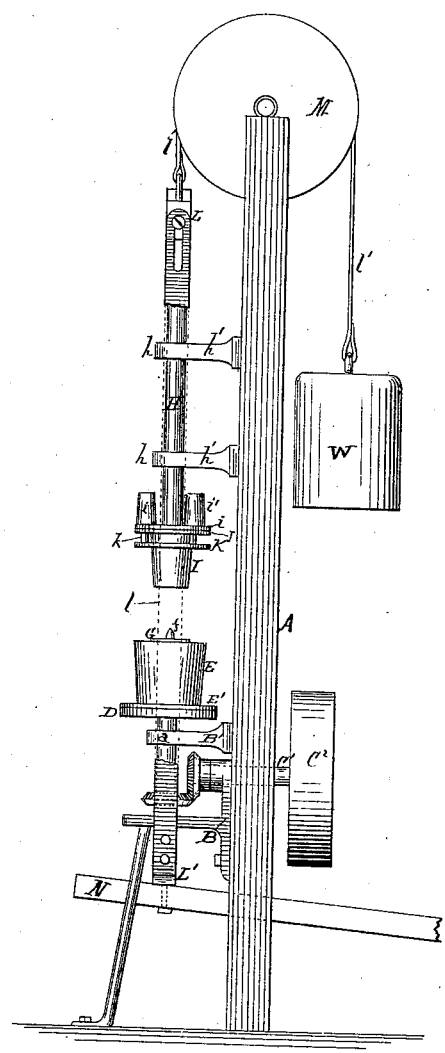

Figure 1 is a front view of the machine. Fig. 2 is a side view of the same. Fig. 3 is a sectional elevation of the same. Fig. 4 is a sectional detail view. Fig. 5 is a horizontal view taken at line 1 in Fig. 1. Fig. 6 is a horizontal view taken at line 2 in Fig. 2.

A is the frame of the machine, which may be made of wood or iron.

B is a bracket, secured to frame A, and is provided with step-bearing $a$.

B' is a second bracket, having with it bearing $b$, arranged vertically over step-bearing $a$.

C is a vertical shaft supported by bearings $a$ and $b$, and adapted to be revolved.

$c$ is a miter wheel or gear revolved by miter-gear $c'$, fixed to horizontal shaft C', supported by suitable bearings, and provided with band-pulley $C^2$ for imparting motion to shaft C'.

D is a mold-holding head secured to upper end of shaft C by means of screw-thread $s$. This head is preferably made with a circular form, and of size large enough to receive the largest size mold to be employed in the machine.

E is the mold, made of metal or other suitable material and having its chamber made with a gradually-tapering form and with any preferred design. E' is a flange made on its lower end, and is provided with screw-thread $s'$, corresponding with screw-thread $s$ on shaft C. Shaft C is made with a central bore, $e$, running through its entire length.

F is a vertical shaft working in bore $e$, and is made with a length so much greater than shaft C that its upper end will terminate at a point on a line with the horizontal plane of upper end of mold E, as shown. Secured to the upper end of this shaft F is disk G, which in its elevated position (shown in Fig. 3) serves as a platform for receiving the clay to be molded and lowering the same to the bottom of the mold. This disk has fixed to its upper side and central thereto the conical projection $f$, which serves two purposes—one for holding central with the ball or lump of clay to prevent its shifting when it is being lowered, and the other for forming the central hole in the bottom of the molded pot.

H is a vertical shaft held and guided in way-sleeves $h\ h$, made with brackets $h'\ h'$, secured to frame A. This shaft is free to be moved endwise in either direction. The lower end of this shaft is provided with mandrel-die I, which is made with a tapering form, corresponding with the taper of the mold-chamber of mold E, but of less diameter, so as to leave a space all around equal to the thickness of the pot to be molded. This mandrel-die has recess $i^2$ made in its lower end. Secured to flange $i$, made with the die I, are spring-receptacles $i'$, which hold springs $r$.

K is a follower made with a ring form and arranged loosely around the upper portion of die I, and is supported from flange $i$ by guiding-pins $k\ k$, working vertically in holes made in attaching-plate $j$, secured to flange $i$ from its lower side. The upper ends of these guide-pins are provided with heads that hold with the upper side of plate $j$, with their lower ends secured to the follower. Springs $r$ have bearing on the head ends of the guide-pins, and force the same and their attached follower downward to the limit permitted by said heads. By these means the follower K is made to have an elastic connection with die I.

L is a yoke secured to shaft H with its outer ends attached to draw rods or bars $l\ l$. A lifting-strap, $l'$, is secured by one of its ends to yoke L, and, passing over pulley M, is attached to weight W or an equivalent spring. The lower ends of rods $l\ l$ are secured to lower yoke, L', which is attached to treadle N.

O is a cross-bar arranged above yoke L', and provided at about its middle of length with a screw-threaded hole, into which works the screw-threaded stem of the adjustable step P, which is provided with mesh-nut $p$ for holding said step from being changed from its adjusted position.

The manner in which the parts of this machine operates is as follows: In the normal condition of position of parts the adjustable step P holds disk G up at the upper end of the mold. The clay, (in a mass sufficient to form a pot,) shaped in a lump form, is placed on this disk, when its spur $f$ will pierce into the same and hold the mass with the disk, and preventing the same from shifting in either direction thereon. When the lump of clay is in proper position on disk G, the operator will suddenly and with considerable force press down the treadle N to its full distance. In the first half of the downward movement of the treadle, shaft F of this disk will have bearing on the step P, which will be lowered, and permit said disk, with the clay thereon, to be lowered into the mold, when disk G will form the bottom part of said mold. While the disk and clay are being lowered into the mold, treadle N will, through yokes L L', and draw-rods $l\ l$, and shaft H, force die I downward to follow after the clay being lowered; and in the further continued movement of the treadle the die I will be carried down on the clay, which latter, being plastic, will yield in all directions under the pressure of the die and fill in all around the space between the die and the mold, and in the downward movement of the die continued the follower K will be brought down to have a bearing on the upper edge of mold E, as shown in Fig. 4. In this situation this follower will operate as a cover to the upper an open end of the mold, to close the same under elastic pressure from springs $r$. The operator will now cause the mold to be revolved by means of the miter-gears $c\ c'$ and band-wheel, revolved by any suitable power, and while the mold is being revolved the treadle will be still further forced down into the mold, while the follower will yield before the pressure until it reaches the flange-ring $k$ above. In this further downward movement of the die into the clay, the clay will be forced out in all directions from below the die and completely fill, in a compact condition, all parts of the mold, while the surplusage of clay will be raised to the follower and lift the same sufficiently to allow its escape, while the mold is being revolved, from between the upper edge of the mold and the follower, and when this surplusage has been worked out and off the springs $r$ will cause the follower to be brought down to the mold again and operate to finish the upper end of the pot, and while the revolution of the mold is continued the operator will relieve the treadle of pressure, when weight W will operate to lift up on the die and withdraw the same. In the first part of this upward movement of the die from the molded pot the follower will have a bearing on the upper end of the mold and hold the pot from being lifted with the die, and as soon as the die is free from contact with the molded pot the follower will be carried upward with the die, and when the weight has further lifted up the die (the step P) the latter will be brought against the shaft of disk G, and the pot, being relieved of pressure from the die, will be readily lifted up out of the mold by the rising disk G, and be carried fully above the upper end of the mold for easy and convenient removal thereof. When disk G is at the bottom of the mold, the spud $f$ will penetrate through the clay and enter recess $i^2$ in the lower end of die I, when the latter is forced down to its limit of thrust, and thereby form in the pot the usual drainage-hole.

By means of the holding-head D different-sized pot-molds can be secured thereon, and corresponding size and form dies will be secured to shaft H. The adjustable step P will be properly adjusted whenever a change of mold and die is made. When a crank is employed to revolve the shaft C', I would arrange it so that it can be readily worked by the operator from the right side of the machine; and when a band-wheel driven by power is employed, I would place between it and the gear a suitable clutch-gear for conveniently starting and stopping the revolution of the mold E.

Having described my invention, what I claim, and desire to secure by Letters Patent, is—

1. The combination, with the revolving mold E, held from moving vertically, and reciprocating die I, held from revolving and having flange $i$ at its upper end, and coacting with mold E, for forming flower-pots, of spring-receptacles $i'$, springs $r$, ring-form follower K, guide-pins $k\ k$, working through plate $j$, secured to flange $i$, and having their lower ends secured to follower K and their upper ends provided with heads, serving as seats of springs $r$, all substantially as described, for the purposes and operations set forth.

2. The combination, with mold E, which is revolved on one horizontal plane, disk G, provided with projecting spur $f$ and mounted on reciprocating vertical shaft F, and step P, of the die I, secured to reciprocating vertical shaft H, elastic follower K, concentric to said die and steadied and made elastic by mechanism, as above described, yokes L L', draw-rods $l\ l$, treadle N, and weight W, having connection with yoke L, all substantially as shown and described, for the purposes and operations set forth.

HERMANN AMMENHEUSER.

Witnesses:
LEWIS T. NEWELL,
ALEX. SELKIRK.